US010850704B2

United States Patent
Suda et al.

(10) Patent No.: US 10,850,704 B2
(45) Date of Patent: Dec. 1, 2020

(54) ELECTRONIC KEY MANAGEMENT DEVICE, ELECTRONIC KEY MANAGEMENT SYSTEM, ELECTRONIC KEY MANAGEMENT METHOD, AND STORAGE MEDIUM

(71) Applicant: HONDA MOTOR CO., LTD., Minato (JP)

(72) Inventors: Satoshi Suda, Wako (JP); Shinichi Ueda, Wako (JP); Masashi Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/352,951

(22) Filed: Mar. 14, 2019

(65) Prior Publication Data

US 2019/0291693 A1 Sep. 26, 2019

(30) Foreign Application Priority Data

Mar. 20, 2018 (JP) ................... 2018-053420

(51) Int. Cl.
  *B60R 25/24* (2013.01)
  *H04W 12/04* (2009.01)
  *H04W 12/06* (2009.01)

(52) U.S. Cl.
  CPC ......... *B60R 25/24* (2013.01); *H04W 12/0401* (2019.01); *H04W 12/04031* (2019.01);
  (Continued)

(58) Field of Classification Search
  None
  See application file for complete search history.

(56) References Cited

U.S. PATENT DOCUMENTS 9,397,829 B2 * 7/2016 Iwashita ............... H04L 9/0861
9,509,499 B2 * 11/2016 Kawamura ........... H04L 9/0869
(Continued)

FOREIGN PATENT DOCUMENTS

JP   08-185579    7/1996
JP   2003-341480  12/2003
(Continued)

OTHER PUBLICATIONS

Japanese Notice of Allowance for Japanese Patent Application No. 2018-053420 dated Sep. 17, 2019.

*Primary Examiner* — K. Wong
(74) *Attorney, Agent, or Firm* — Amin, Turocy & Watson, LLP (57) ABSTRACT

An electronic key management device includes a generator (152, 153) configured to generate at least one of a first execution key and a second execution key for obtaining a permission for transiting to a registration mode for registering an electronic key of a vehicle in an in-vehicle authentication device or to an invalidation mode for invalidating the electronic key registered in the in-vehicle authentication device, in response to a predetermined request, and a communication controller (154) configured to transmit the first execution key generated by the generator to a first terminal device, and transmit the second execution key generated by the generator to a second terminal device that is a terminal device different from the first terminal device and is registered in advance as a terminal device of an authorized owner.

9 Claims, 5 Drawing Sheets

(52) U.S. Cl.
CPC ....... *H04W 12/06* (2013.01); *B60R 2325/202* (2013.01); *B60R 2325/205* (2013.01)

(56) References Cited

U.S. PATENT DOCUMENTS 10,139,481 B2 * 11/2018 Murakami ............ B60R 25/245
10,249,123 B2 * 4/2019 Hatton ............... G07C 9/00857

FOREIGN PATENT DOCUMENTS

| | | |
|---|---|---|
| JP | 2013-014958 | 1/2013 |
| JP | 5257814 | 8/2013 |

* cited by examiner

| VEHICLE BODY NUMBER | DEALER MAIL ADDRESS | USER MAIL ADDRESS | EXECUTION KEY |
|---|---|---|---|
| 00001005 | AAA@abc.com | BBB@abc.com | XXXXYYYY |
| ... | ... | ... | ... |
| ... | ... | ... | ... |
| ... | ... | ... | ... |

ELECTRONIC KEY MANAGEMENT DEVICE, ELECTRONIC KEY MANAGEMENT SYSTEM, ELECTRONIC KEY MANAGEMENT METHOD, AND STORAGE MEDIUM

CROSS-REFERENCE TO RELATED APPLICATION

Priority is claimed on Japanese Patent Application No. 2018-053420, filed Mar. 20, 2018, the content of which is incorporated herein by reference.

BACKGROUND

Field of the Invention

The present invention relates to an electronic key management device, an electronic key management system, an electronic key management method, and a storage medium.

Description of Related Art

In recent years, electronic keys have become widespread as vehicle keys. An electronic key and a vehicle are associated with each other in advance by an immobilizer mounted on the vehicle. For example, the association between a vehicle and an electronic key is performed at a dealer store when the vehicle is delivered or when the electronic key is lost. In the dealer store, a diagnostic machine connected to the immobilizer through a cable is prepared, and in a case where necessary information is input from the diagnostic machine, an operation mode of the immobilizer is switched to a registration mode in which the association between the vehicle and the electronic key is able to be executed. The immobilizer that is executing the registration mode receives unique key information from the electronic key, and thus the vehicle and the electronic key are associated with each other.

In relation to this, a technology in which a center manages information necessary for switching to a registration mode, and after a diagnostic machine executes a predetermined process with the center, the diagnostic machine receives the information necessary for switching to the registration mode from the center is known (for example, refer to Japanese Patent No. 5257814).

SUMMARY

However, in the related art, there was a case where a diagnostic machine is connected to a vehicle without permission by a malicious third party, a predetermined process is executed with a center using the diagnostic machine, and a mode is illegally switched to a registration mode. For example, a method for invalidating original key information of an authorized owner and registering another new key information (a so-called immobilizer-cutter) becomes a problem. With such a method, there was a problem that an electronic key prepared by this third party is associated with the vehicle and security of the vehicle is deteriorated.

An aspect of the present invention has been made in consideration of such a circumstance, and an object of the present invention is to provide an electronic key management device, an electronic key management system, an electronic key management method, and a storage medium that improve security of a vehicle.

An electronic key management device, an electronic key management system, an electronic key management method, and a storage medium according to the present invention adopt the following constitutions.

(1): An electronic key management device according to an aspect of the present invention includes a generator configured to generate at least one of a first execution key and a second execution key for obtaining a permission for transiting to a registration mode for registering an electronic key of a vehicle in an in-vehicle authentication device or to an invalidation mode for invalidating the electronic key registered in the in-vehicle authentication device, in response to a predetermined request, and a communication controller configured to transmit the first execution key generated by the generator to a first terminal device, and transmit the second execution key generated by the generator to a second terminal device that is a terminal device different from the first terminal device and is registered in advance as a terminal device of an authorized owner.

(2): In the aspect of (1), the generator generates an execution key related to the first execution key and the second execution key based on at least one of information on the vehicle or information on a registration date, and the communication controller transmits the execution key to the in-vehicle authentication device.

(3): In the aspect of (1), the generator generates an execution key based on at least one of information on the vehicle or information on a registration date, and divides the execution key to generate the first execution key and the second execution key.

(4): In the aspect of (2), the communication controller transmits the execution key generated by the generator to the in-vehicle authentication device that has transmitted the execution request of the registration mode or the invalidation mode.

(5): In the aspect of (1), the communication controller transmits information indicating a sequence when connecting the first execution key and the second execution key, to at least one of the first terminal device and the second terminal device.

(6): An electronic key management system according to an aspect of the present invention includes the electronic key management device of the aspect of (1), and the in-vehicle authentication device configured to perform authentication based on the first execution key and the second execution key in a case where the first execution key and the second execution key are input, and execute the registration mode or the invalidation mode in a case where the authentication is successful.

(7): An electronic key management system according to an aspect of the present invention includes the electronic key management device of the aspect of (3), and the in-vehicle authentication device configured to determine whether or not information based on the first execution key and the second execution key matches the execution key in a case where the execution key, the first execution key, and the second execution key are input, and determine that authentication is successful in a case where both of the information based on the first execution key and the second execution key matches the execution key.

(8): An electronic key management method according to an aspect of the present invention causes a computer to generate at least one of a first execution key and a second execution key for obtaining a permission for transiting to a registration mode for registering an electronic key of a vehicle in an in-vehicle authentication device or to an invalidation mode for invalidating the electronic key registered in the in-vehicle authentication device, in response to a predetermined request, transmit the generated first execution key to a first terminal device, and transmit the generated second execution key to a second terminal device that is a terminal device different from the first terminal device and is registered in advance as a terminal device of an authorized owner.

(9): A computer-readable non-transitory storage medium storing a program according to an aspect of the present invention causes a computer to generate at least one of a first execution key and a second execution key for obtaining a permission for transiting to a registration mode for registering an electronic key of a vehicle in an in-vehicle authentication device or to an invalidation mode for invalidating the electronic key registered in the in-vehicle authentication device, in response to a predetermined request, transmit the generated first execution key to a first terminal device, and transmit the generated second execution key to a second terminal device that is a terminal device different from the first terminal device and is registered in advance as a terminal device of an authorized owner.

According to the aspects (1) to (9), it is possible to improve security of a vehicle.

DESCRIPTION OF EMBODIMENTS

Hereinafter, embodiments of an electronic key management device, an electronic key management system, an electronic key management method, and a storage device of the present invention will be described with reference to the drawings.

[Overall Constitution]

Figure 1:
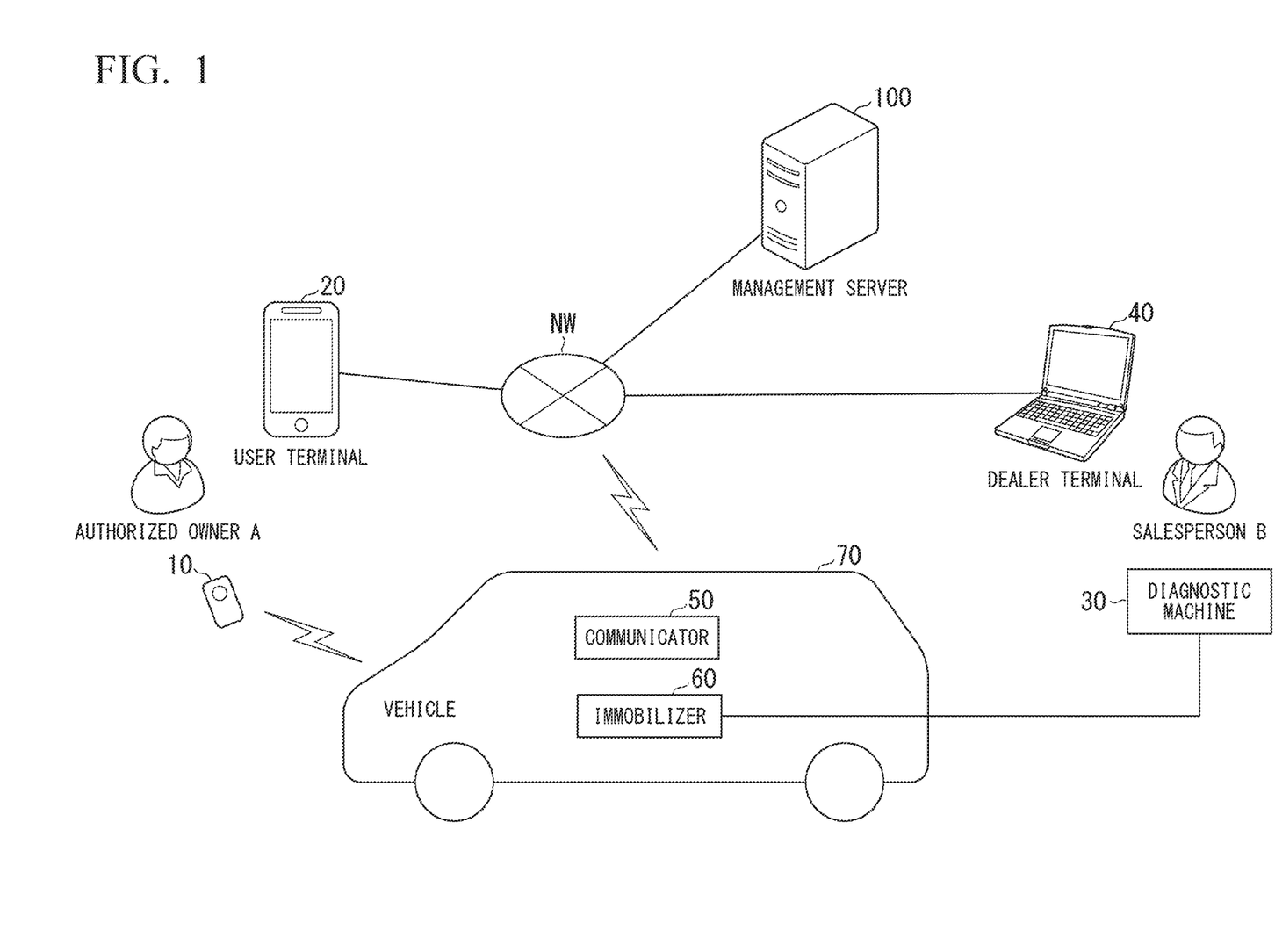
FIG. 1 is a constitution diagram of an electronic key management system according to an embodiment.

FIG. 1 is a constitution diagram of an electronic key management system 1 according to an embodiment. The electronic key management system 1 includes, for example, an electronic key 10, a user terminal 20, a diagnostic machine 30, a dealer terminal 40, a communicator 50, an immobilizer 60, and a management server 100. The user terminal 20, the dealer terminal 40, the communicator 50, and the management server 100 communicate with each other using a network NW. The network NW includes a part or all of, for example, a wide area network (WAN), a local area network (LAN), the Internet, a provider device, a wireless base station, a dedicated line, and the like.

The communicator 50 and the immobilizer 60 are mounted in a vehicle 70. The immobilizer 60 is an example of an in-vehicle device (that is, an in-vehicle authentication device) that performs an authentication process. The in-vehicle authentication device may be any device other than the immobilizer as long as the device is an in-vehicle device performing the authentication process.

The vehicle 70 is, for example, a vehicle purchased by an authorized owner A. Registration work and invalidation work of the electronic key 10, which will be described below, are performed, for example, in a dealer store at a time of delivery, a time of additional registration, or a time of registration deletion. The time of additional registration is a time when a new electronic key is registered when an electronic key is lost or a time when a new electronic key of a second key or a key after the second key is registered, or the like. At the time of registration deletion is a time when a lost electronic key is deleted from registration, or the like. In the following, these will be described without distinction. Hereinafter, an example in which the registration work and the invalidation work are performed by a salesperson B at a dealer store will be described.

The electronic key 10 is an electronic key prepared for registration in the vehicle 70. In the electronic key 10, key information is stored in a storage provided therein. The key information is, for example, identification information for identifying the electronic key 10. The electronic key 10 is provided with a predetermined switch, and the key information stored in the storage of the electronic key 10 is transmitted by operating the switch.

The user terminal 20 is a terminal device used by the authorized owner A. The user terminal 20 is, for example, a tablet terminal, a smartphone, a personal digital assistant (PDA), a laptop computer, or the like.

For example, the diagnostic machine 30 diagnoses a failure or the like of the vehicle in a state in which the diagnostic machine 30 is connected to the immobilizer 60 using a dedicated wired cable. When the diagnostic machine 30 is connected to the immobilizer 60, the diagnostic machine 30 may be connected to the immobilizer 60 indirectly through another ECU or directly. In the embodiment, the diagnostic machine is used as a tool for causing the immobilizer 60 to execute a predetermined mode.

The dealer terminal 40 is a terminal device used by the salesperson B of the dealer store. The dealer terminal 40 is, for example, a desktop computer or a notebook computer installed in the dealer store, and may be a tablet terminal, a smartphone, a PDA, or the like.

The communicator 50 is, for example, a wireless communication module for connecting to the network NW through a cellular network or a Wi-Fi network. The communicator 50 is connected to the immobilizer 60, and outputs information received from an external device such as the management server 100 to the immobilizer 60.

The immobilizer 60 stores the key information of the electronic key registered by the registration process of the electronic key 10 in the storage (described later), and collates the key information with the electronic key 10. Specifically, the immobilizer 60 collates the registered key information with the key information received from the electronic key 10, and determines whether or not the registered key information and the key information received from the electronic key 10 match. In a case where it is determined that the key information received from the electronic key 10 matches the key information stored in the storage by the determination process (in a case where the electronic key 10 is authenticated as an authorized key, that is, in a case where the authentication is successful), the immobilizer 60 permits a predetermined operation such as locking or releasing a door of the vehicle 70, starting an engine of the vehicle 70, and the like. On the other hand, the authentication is not successful with the key information received from the electronic key 10 that is not registered. In this case, the immobilizer 60 does not permit the predetermined operation.

The management server 100 issues an execution key that is input to the diagnostic machine 30 by the salesperson B in the registration process or the invalidation process of the electronic key 10, which will be described below. The execution key is information for obtaining permission to transition to the registration mode or the invalidation mode. The registration mode is a mode in which the electronic key 10 is registered in the immobilizer 60 as an electronic key dedicated to the vehicle 70. The invalidation mode is a mode in which the electronic key registered in the immobilizer 60 as the electronic key dedicated to the vehicle 70 is invalidated. The salesperson B of the dealer store performs the association between the electronic key 10 and the vehicle 70 after switching the immobilizer 60 to the registration mode using information based on this execution key (which will be described in detail later). The salesperson B of the dealer store cancels the association between the electronic key 10 and the vehicle 70 after switching the immobilizer 60 to the invalidation mode using the information based on the execution key.

[Diagnostic Machine 30]

Figure 2:
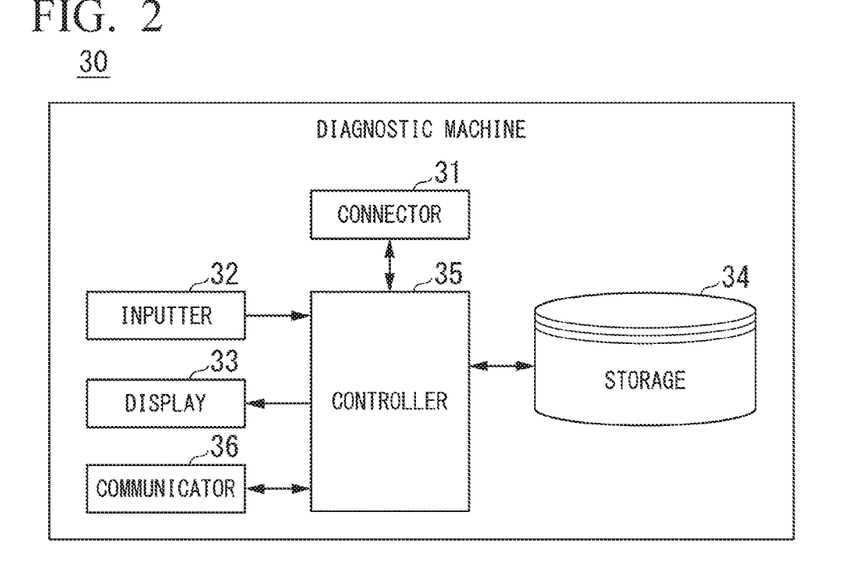
FIG. 2 is a constitution diagram of a diagnostic machine.

FIG. 2 is a constitution diagram of the diagnostic machine 30. As shown in FIG. 2, the diagnostic machine 30 includes a connector 31, an inputter 32, a display 33, a storage 34, a controller 35, and a communicator 36. The connector 31 is a connector to which a wired cable is connected. The connector 31 is connected to the immobilizer 60 through a wired cable. The inputter 32 is various keys, buttons, or the like. The display 33 is a liquid crystal display (LCD) or the like. The storage 34 is realized by a random access memory (RAM), a read only memory (ROM), a flash memory, or the like. For example, the controller 35 communicates with the immobilizer 60 on the basis of the information input by the salesperson B using the inputter 32 and executes a predetermined process on the basis of the information received from the immobilizer 60. The communicator 36 is, for example, a wireless communication module (communication machine) for connecting to the network NW through a cellular network or a Wi-Fi network.

[Management Server 100]

Figure 3:
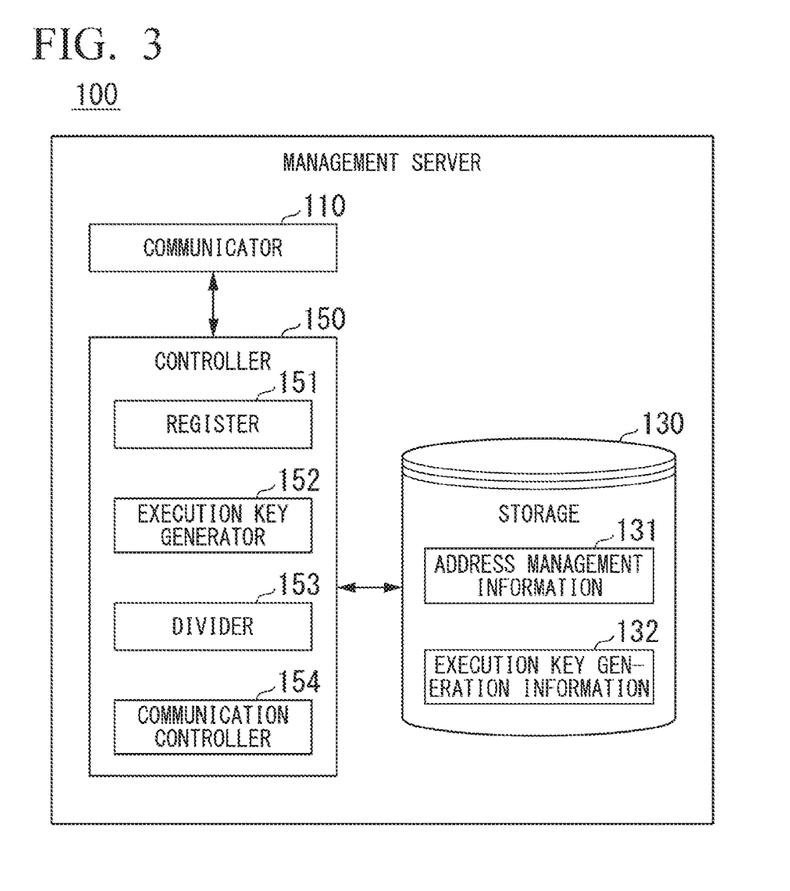
FIG. 3 is a constitution diagram of a management server.

Before the immobilizer 60, description of the management server 100 will be given first. FIG. 3 is a constitution diagram of the management server 100. As shown in FIG. 3, the management server 100 includes a communicator 110, a storage 130, and a controller 150. For example, the communicator 110 includes a communication interface such as a network interface card (NIC). The storage 130 is a flash memory such as a RAM, a ROM, a solid state drive (SSD), a hard disk drive (HDD), or the like. For example, the storage 130 stores information such as address management information 131 and execution key generation information 132. The execution key generation information 132 is information necessary for generating an execution key. For example, the execution key generation information 132 includes an arithmetic expression, a program, and the like for deriving the execution key on the basis of the input information.

Figure 4:
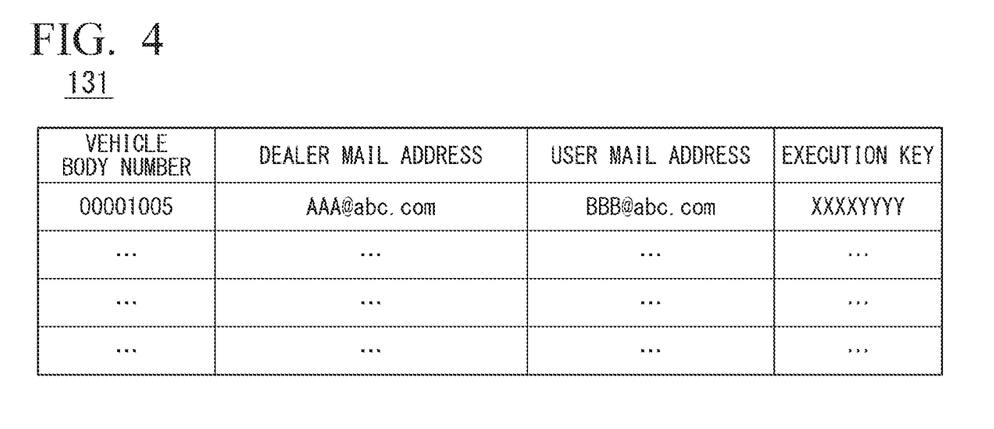
FIG. 4 is a diagram showing an example of details of address management information.

FIG. 4 is a diagram showing an example of details of the address management information 131. As shown in FIG. 4, the address management information 131 is, for example, information in which a dealer mail address, a user mail address, and an execution key are associated with a vehicle body number. The vehicle body number is identification information for identifying each vehicle 70, and is, for example, a number displayed on a number plate attached (or planned to be attached) to the vehicle 70. The dealer mail address is a mail address capable of receiving a mail by the dealer terminal 40. The user mail address is a mail address capable of receiving a mail by the user terminal 20. The execution key is, for example, an execution key generated by the management server 100 on the basis of a corresponding vehicle body number or the like. The dealer mail address and the user mail address are examples of addresses when transmitting information to the dealer terminal 40 and the user terminal 20, and are not particularly limited to the mail addresses as long as the execution key is able to be transmitted and received.

The controller 150 includes, for example, a register 151, an execution key generator 152, a divider 153, and a communication controller 154. Such constitutions are realized, for example, by a hardware processor such as a central processing unit (CPU) executing a program (software). A combination of the execution key generator 152 and the divider 153 is an example of a "generator". The program may be stored in a storage device such as an HDD or a flash memory of the management server 100 in advance, or may be stored in a detachable storage medium such as a DVD or a CD-ROM, the storage medium may be attached to a drive device, and thus the program may be installed in the HDD or the flash memory of the management server 100.

The register 151 stores the information in which the dealer mail address received from the dealer terminal 40 is associated with the user mail address received from the user terminal 20 in the storage 130 as a part of the address management information 131, in the body number received from the dealer terminal 40.

For example, the execution key generator 152 generates the execution key K using the execution key generation information 132 in response to an execution request from the immobilizer 60. For example, the execution key generation information 132 generates the execution key K on the basis of static information such as a vehicle number registered in the address management information 131 and dynamic information such as date and time information of a registration date. The execution key generator 152 stores the generated execution key K in the address management information 131 of the storage 130 in association with the corresponding vehicle number.

The divider 153 generates a first execution key K1 and a second execution key K2 on the basis of the execution key K generated by the execution key generator 152. For example, the divider 153 divides a numeric string (which may include characters) of the execution key K into two of a first half and a last half, sets a numeric string of the first half as the first execution key K1 and a numeric string of the last half as second execution key K2. The execution key K is, for example, an 8-digit number pin code. In this case, the divider 153 divides the execution key K into 4-digit numbers, sets a first 4-digit as the first execution key K1, and sets a last 4-digit as the second execution key K2. The first execution key K1 and the second execution key K2 may be related to the execution key K and are not limited to the divided information. For example, the first execution key K1 and the second execution key K2 may include a numeric string of the execution key K and information indicating a method of synthesizing the execution key K.

The communication controller 154 transmits the execution key K generated by the execution key generator 152 to the immobilizer 60 that has transmitted the execution request of the registration mode or the invalidation mode. Hereinafter, the execution key K transmitted to the immobilizer 60 will be referred to as an execution key Ki. The execution key Ki is the same information as the execution key K.

The communication controller 154 transmits the first execution key K1 and the second execution key K2 generated by the divider 153 to the dealer terminal 40 and the user terminal 20, respectively. Hereinafter, an example will be described in which the first execution key K1 is transmitted to the dealer terminal 40 and the second execution key K2 is transmitted to the user terminal 20 by the communication controller 154. However, transmission destinations of each piece of information may be reversed. For example, the communication controller 154 reads the dealer mail address associated with the execution key K generated by the execution key generator 152 from the address management information 131, and transmits a mail including the first execution key K1 to the read dealer mail address. The communication controller 154 reads the user mail address associated with the execution key K generated by the execution key generator 152 from the address management information 131 and transmits a mail including the second execution key K2 to the read user mail address. The dealer terminal 40 or the user terminal 20 displays the received first execution key K1 or the second execution key K2 on its display. The display is referred to by an operator, and hereinafter, an execution key that is input to the inputter 32 by the operator and input to the immobilizer 60 from the diagnostic machine 30 is referred to as an execution key Kt(m). The execution key Kt(m) is, for example, information in which the second execution key K2 is subsequently arranged from the first execution key K1.

[Immobilizer 60]

Figure 5:
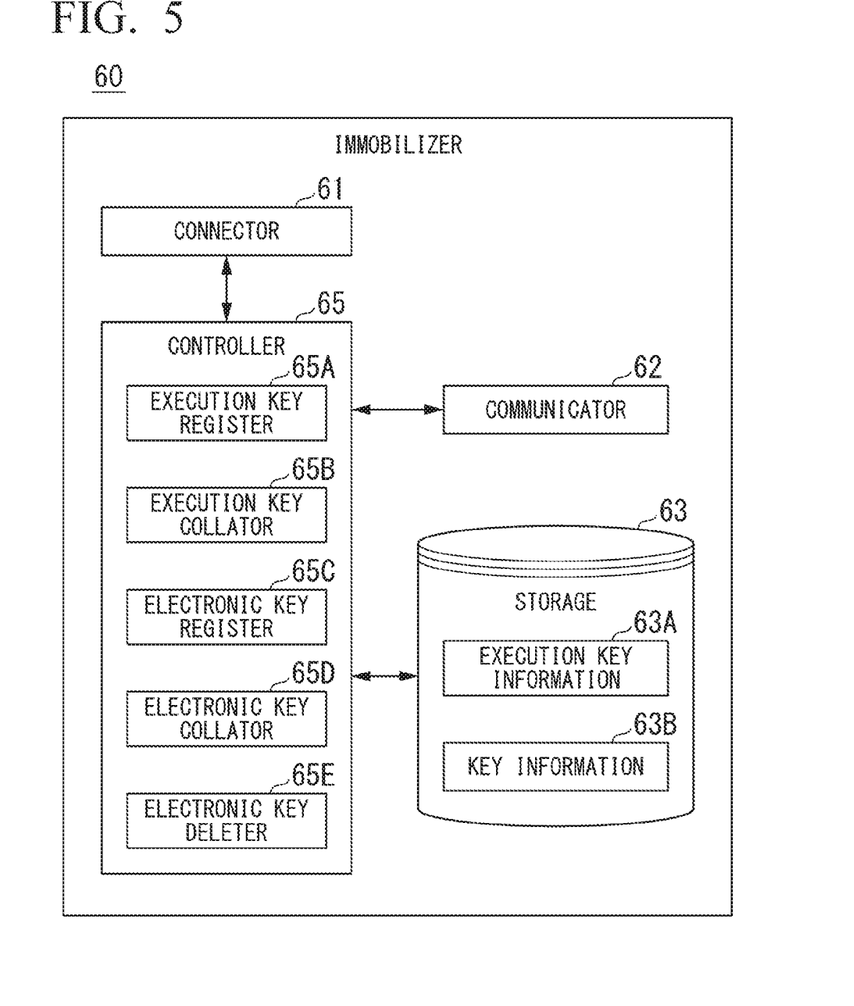
FIG. 5 is a constitution diagram of an immobilizer.

FIG. 5 is a constitution diagram of the immobilizer 60. As shown in FIG. 5, the immobilizer 60 includes a connector 61, a storage 63, and a controller 65. The connector 61 is a connector to which a wired cable is connected. The connector 61 is connected to the diagnostic machine 30 and the communicator 50 through a wired cable. The storage 63 is realized by a RAM, a ROM, a flash memory, or the like.

For example, information such as execution key information 63A, key information 63B, and the like are stored in the storage 63. The execution key information 63A is information indicating the execution key Ki received from the management server 100. The key information 63B is identification information allocated to the electronic key 10 registered as the electronic key dedicated to the vehicle 70 (that is, the immobilizer 60) in the registration mode. A plurality of pieces of key information may be included in the key information 63B.

The controller 65 includes, for example, an execution key register 65A, an execution key collator 65B, an electronic key register 65C, an electronic key collator 65D, and an electronic key deleter 65E. Such constitutions are realized, for example, by a hardware processor such as a CPU executing a program (software). The program may be stored in a storage device such as an HDD or a flash memory of the immobilizer 60 in advance, or may be installed in the HDD or the flash memory of the immobilizer 60 by being stored in a detachable storage medium such as a DVD or a CD-ROM and the storage medium being attached to a drive device.

In a case where the execution request of the registration mode is input from the diagnostic machine 30 or in a case where the execution request of the invalidation mode is input from the diagnostic machine 30, the execution key register 65A transmits the input information to the management server 100. In a case where the execution key register 65A receives the execution key from the management server 100, the execution key register 65A stores the execution key in the storage 63 as the execution key information 63A.

The execution key collator 65B collates the execution key Kt(m) input from the diagnostic machine 30 with the execution key Ki read from the execution key information 63A of the storage 63. The execution key collator 65B determines whether or not the execution key Kt(m) and the execution key Ki match, and in a case where these two match, the execution key collator 65B authenticates the execution key Kt(m) input from the diagnostic machine 30 as an authorized key (that is, determines that the authentication is successful). On the other hand, in a case where it is determined that they do not match by the collation, the execution key collator 65B does not authenticate the execution key Kt(m) input from the diagnostic machine 30 as the authorized key (that is, determines that the authentication is not successful). The fact that the keys match each other may include various meaning such as meaning that correct information is able to be obtained in a case where the information encrypted using one key is decrypted using the other key, in addition to meaning that each information indicated by the keys match or parts of each information match. The same applies to the following.

The electronic key register 65C is an execution unit that transitions to the registration mode and executes a registration process. In a case where the execution key Kt(m) input from the diagnostic machine 30 is authenticated as the authorized key by the execution key collator 65B, the electronic key register 65C executes the registration mode in response to the execution request of the registration mode from the diagnostic machine 30. The execution request of the registration mode may be performed before or after the authentication. In a case where the key information is received from the electronic key 10 during the execution of the registration mode, the electronic key register 65C stores the received key information as the key information 63B in the storage 63, and ends the registration mode.

In a case where the key information is received from the vehicle key 10, the electronic key collator 65D collates the received key information with the key information 63B of the storage 63. The electronic key collator 65D determines whether or not they match by the collation, and in a case where both match, the electronic key collator 65D authenticates the key information received from the vehicle key 10 as the authorized key. In a case where the key information received from the vehicle key 10 is authenticated as the authorized key, the electronic key collator 65D permits a predetermined operation such as locking or releasing the door of the vehicle 70 or starting the engine of the vehicle 70. On the other hand, in a case where they do not match by the collation, since the electronic key collator 65D does not authenticate the key information received from the vehicle key 10 as the authorized key, the electronic key collator 65D does not permit the predetermined operation.

The electronic key deleter 65E is an execution unit that transits to the invalidation mode and executes an invalidation process. In a case where the execution key input from the diagnostic machine 30 is authenticated as the authorized key by the execution key collator 65B, the electronic key deleter 65E executes the invalidation mode in response to the invalidation request of the registration mode from the diagnostic machine 30. The execution request of the invalidation mode may be performed before or after the authentication. In a case where the key information is received from the electronic key 10 during the execution of the invalidation mode, the electronic key deleter 65E determines whether or not the received key information is stored in the storage 63 as the key information 63B. In a case where the key information received from the electronic key 10 is stored in the storage 63 as the key information 63B, the electronic key deleter 65E deletes the key information received from the electronic key 10 from the storage 63, and ends the invalidation mode.

[Sequence Diagram]

Figure 6:
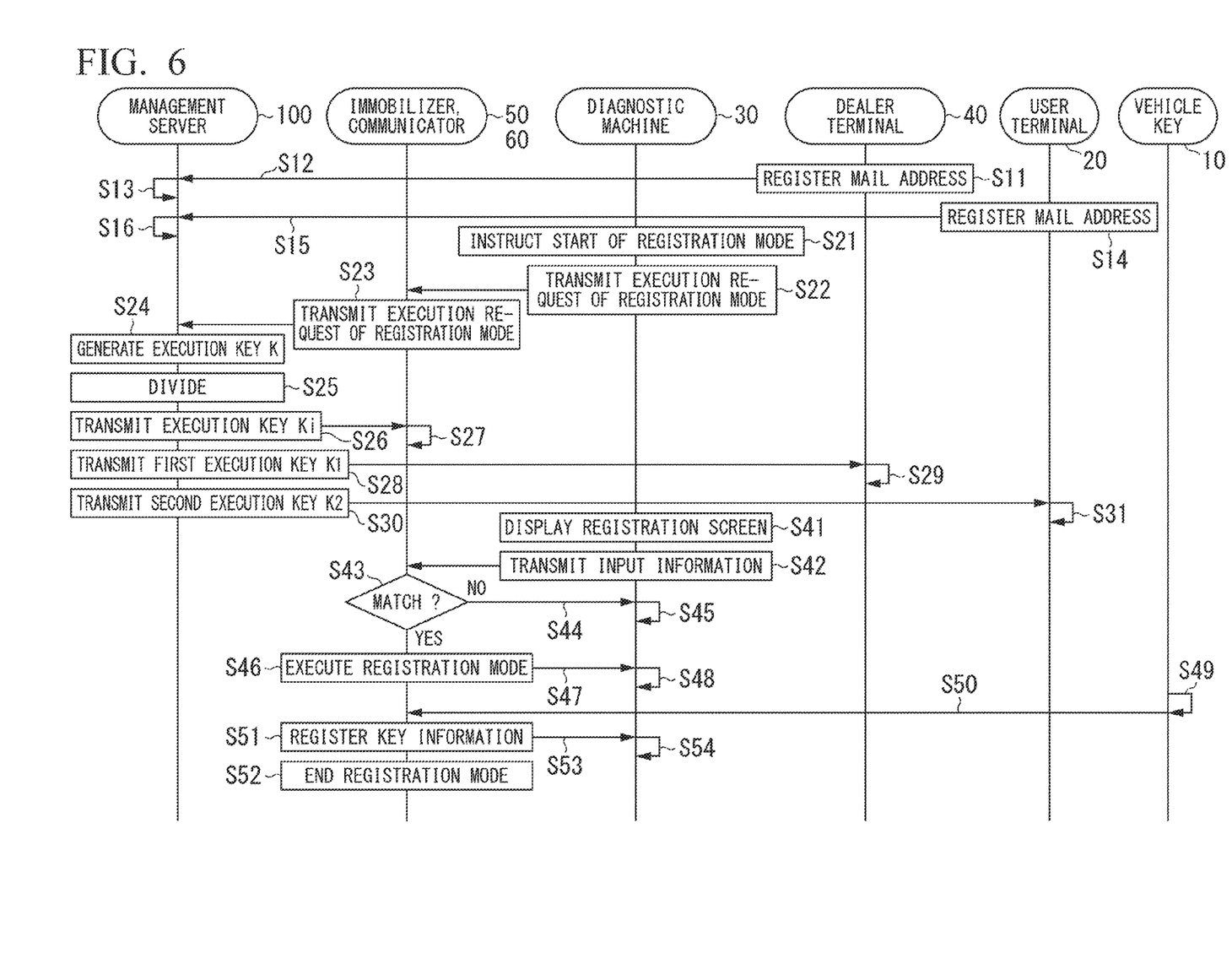
FIG. 6 is a sequence diagram showing a flow of a process by the electronic key management system.

FIG. 6 is a sequence diagram showing a flow of a process by the electronic key management system 1. Hereinafter, a case where the registration mode is executed will be described. First, the salesperson B operates the dealer terminal 40 to perform work of registering the dealer mail address in the management server 100 (step S11). Therefore, the dealer terminal 40 transmits the input dealer mail address to the management server 100 (step S12). The management server 100 stores the received dealer mail address in the storage 130 (step S13).

The authorized owner A operates the user terminal 20 to perform work of registering the user mail address in the management server 100 (step S14). Therefore, the user terminal 20 transmits the input user mail address to the management server 100 (step S15). The management server 100 stores the received user mail address in the storage 130 (step S16).

Next, the salesperson B operates the diagnostic machine 30 to instruct start of the execution of the registration mode (step S21). Here, the salesperson B inputs the vehicle body number. Upon receiving the instruction to start the execution of the registration mode, the diagnostic machine 30 outputs the execution request of the registration mode to the immobilizer 60 together with the vehicle body number (step S22). In a case where the execution request of the registration mode is input, the immobilizer 60 transmits the execution request to the management server 100 together with the vehicle body number through the communicator 50 (step S23). In a case where the management server 100 receives the execution request of the registration mode, the management server 100 generates the execution key K on the basis of the vehicle body number, the date and time information, or the like (step S24). Next, the management server 100 divides the generated execution key K to generate the first execution key K1 and the second execution key K2 (step S25).

The management server 100 transmits the execution key Ki generated in step S24 to the immobilizer 60 through the communicator 50 (step S26). The immobilizer 60 stores the received execution key Ki in the storage 63 as the execution key information 63A (step S27).

The management server 100 transmits the first execution key K1 generated in step S25 to the dealer terminal 40 (step S28). The dealer terminal 40 displays the received first execution key K1 on the display of the dealer terminal 40 (step S29). The management server 100 transmits the second execution key K2 generated in step S25 to the user terminal 20 (step S30). The user terminal 20 displays the received second execution key K2 on the display of the user terminal 20 (step S31).

Figure 7:
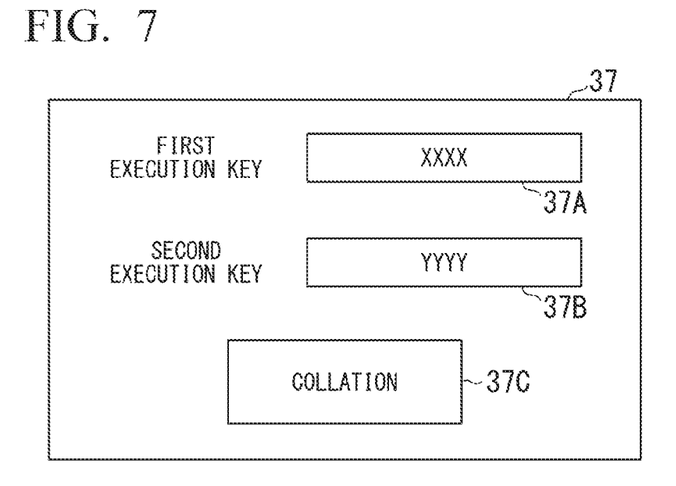
FIG. 7 is a diagram showing an example of an execution key input screen.

Next, the diagnostic machine 30 causes the display 33 to display an input screen (hereinafter referred to as an execution key input screen) for receiving an input of the execution key (step S41). In the execution key input screen, an input column of information other than the execution key and which is necessary for the authentication may be provided. FIG. 7 is a diagram showing an example of the execution key input screen. As shown in FIG. 7, the execution key input screen 37 includes an input column 37A of the first execution key, an input column 37B of the second execution key, and a collation icon 37C. The input column 37A of the first execution key and the input column 37B of the second execution key are input columns for receiving an input of numbers and letters. For example, the salesperson B operates the inputter 32 of the diagnostic machine 30, inputs the first execution key displayed on the dealer terminal 40 to the input column 37A, inputs the second execution key displayed on the user terminal 20 to the input column 37B, and clicks the collation icon 37C. In a case where the collation icon 37C is operated, the diagnostic machine 30 collects information input to the input column 37A of the first execution key and information input to the input column 37B of the second execution key and outputs the collected information to the immobilizer 60 (step S42).

Returning to FIG. 6, the immobilizer 60 collates the execution key Kt(m) input from the diagnostic machine 30 and the execution key Ki stored in the storage 63 in step S27, and determines whether or not they match (step S43). In a case where they do not match, the immobilizer 60 outputs information indicating that the authentication has been failed to the diagnostic machine 30 (step S44), and the diagnostic machine 30 causes the display 33 to display a screen indicating that the authentication has been failed on the basis of the input information (step S45).

On the other hand, in a case where they match in step S43, the immobilizer 60 executes the registration mode (step S46), and outputs the information indicating that the registration mode is being executed (or the authentication of the execution key is successful) to the diagnostic machine 30 (step S47). The diagnostic machine 30 causes the display 33 to display a screen indicating that the registration mode is being executed (or the authentication of the execution key is successful) on the basis of the received information (step S48).

In a case where the screen displayed in step S48 is checked, the salesperson B operates the switch of the vehicle key 10 (step S49). In response to the operation of the salesperson B, the vehicle key 10 transmits the key information held by the vehicle key 10 (step S50). Upon receiving the key information from the vehicle key 10, the immobilizer 60 stores the received key information as the key information 63B in the storage 63 (step S51), and ends the registration mode (step S52). Next, the immobilizer 60 transmits information indicating that the key information is registered to the diagnostic machine 30 (step S53), and the diagnostic machine 30 causes the display 33 to display the received information (step S54).

Also in a case where the invalidation mode is executed, the same process as the above-described process is executed. For example, in step S21, since the salesperson B instructs the start of the execution of the invalidation mode, the execution key for executing the invalidation mode is generated, and the same process as in a case of executing the registration mode is executed. The immobilizer 60 is able to delete the key information of the vehicle key 10 from the registration of the dedicated electronic key by deleting the key information received from the vehicle key 10 from the storage 63 during the execution of the invalidation mode.

According to the electronic key management device of the present embodiment described above, the execution key generator 152 that generates the execution key for obtaining permission for transiting to the registration mode or the invalidation mode, the divider 153 that generates the first execution key and the second execution key on the basis of the execution key generated by the execution key generator 152, and the communication controller 154 that transmits the first execution key generated by the divider 153 to the dealer terminal 40 and transmits the second execution key generated by the divider 153 to the user terminal 20 are provided. Therefore, the immobilizer 60 is not able to execute the registration mode or the invalidation mode without the second execution key K2 delivered to the authorized owner A. Thus, it is possible to prevent a problem that the key information of the electronic key 10 is registered in the immobilizer 60 without permission of the authorized owner and the vehicle 70 is illegally used by using the registered electronic key 10. As a result, it is possible to improve security of the vehicle.

The embodiment described above can be expressed as follows.

An electronic key management device comprising:

a storage device: and a hardware processor that executes a program stored in the storage device, wherein the hardware processor executes the program to:

generate at least one of a first execution key and a second execution key for obtaining a permission for transiting to a registration mode for registering an electronic key of a vehicle in an in-vehicle authentication device or to an invalidation mode for invalidating the electronic key registered in the in-vehicle authentication device, in response to a predetermined request;

transmit the generated first execution key to a first terminal device; and transmit the generated second execution key to a second terminal device that is a terminal device different from the first terminal device and is registered in advance as a terminal device of an authorized owner.

Although the embodiment for implementing the present invention has been described above using the embodiment, the present invention is not limited to the embodiment at all, and various modifications and substitutions can be added within the scope not without departing from the gist of the present invention.

Figure 8:
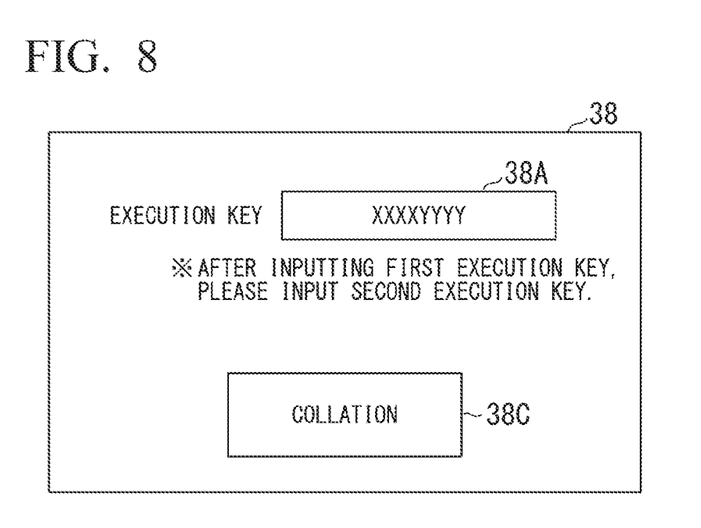
FIG. 8 is a diagram showing an example of the execution key input screen.

For example, the execution key input screen 37 is not limited to the example shown in FIG. 7, and execution key input screen 37 may be a screen as shown in FIG. 8. FIG. 8 is a diagram showing another example of the execution key input screen. As shown in FIG. 8, the execution key input screen 38 includes an execution key input column 38A and a collation icon 38C. An input method of the first execution key and the second execution key may be described on the execution key input screen 38. For example, "after inputting the first execution key, please input the second execution key" is described. It is possible to use the input screen of the related art as is by using such an execution key input screen 38. Similarly, also in a case where the execution key input screen 38 is displayed, the diagnostic machine 30 outputs the information input to the execution key input column 38A to the immobilizer 60.

As shown in FIG. 8, in a case where the execution key input screen has a specification for inputting the first execution key and the second execution key in one input column, the communication controller 154 may transmit information indicating a sequence when connecting the first execution key to the second execution key to at least one of the dealer terminal 40 and the user terminal 20. Therefore, even in a case where the salesperson B does not notice the input method of the first execution key and the second execution key displayed on the execution key input screen 38, it is possible to correctly input the first execution key and the second execution key.

In a case where the invalidation mode is executed, it is also possible to use the same input screen as the execution key input screen as shown in FIGS. 7 and 8.

The execution key collator 65B may acquire a division method by the divider 153 and generate the execution key Kt(m) based on the information input from the diagnostic machine 30 according to the acquired division method.

The divider 153 may divide the execution key by alternately allocating the numeric string of the execution key to the first execution key and the second execution key in order from the head. For example, in a case where the execution key is "12345678", the divider 153 may divide the execution key into the first execution key "1357" and the second execution key "2468". Therefore, the execution key collator 65B alternately combines the first execution key and the second execution key one by one from the head to generate the execution key. In this example, division is performed by alternately allocating characters one by one, but the divider 153 may perform the division by alternately allocating two or more characters, or may perform the division by allocating the number different from the number that is allocated one allocation ago. In the former case, for example, the first execution key "1256" and the second execution key "3478" are allocated, and in the latter case, for example, the first execution key "1347" and the second execution key "2568" are allocated. The execution key collator 65B receives information indicating the generation method (a method of generating the first execution key and the second execution key on the basis of the execution key) by the divider 153 from the management server 100, and connects the first execution key and the second execution key on the basis of the received information.

The communication controller 154 may check the identity of the authorized owner A and the salesperson B before transmitting the execution key. For example, the communication controller 154 transmits check information, which is for checking whether or not to permit the execution of the registration process or the invalidation process of the electronic key 10 with respect to the vehicle 70, to the dealer terminal 40 and the user terminal 20. The check information may include the vehicle body number of the vehicle 70, the date and time when the request is transmitted, and the like. A check screen based on the check information is displayed on the dealer terminal 40 and the user terminal 20, and a permission/prohibition button for inputting whether or not to permit the execution of the registration process or the invalidation process is displayed on the check screen. The dealer terminal 40 and the user terminal 20 transmit operation contents for the permission/prohibition button to the management server 100. In a case where the communication controller 154 receives the information indicating that the permission button is operated from the dealer terminal 40 and the user terminal 20, the communication controller 154 transmits the execution key to the immobilizer 60, and transmits the first execution key and the second execution key generated by the divider 153 to the dealer terminal 40 and the user terminal 20, respectively.

The electronic key 10 may be substituted by a card key, the user terminal 20, or the like. In a case of the card key, the immobilizer 60 receives the key information from the card key by using a card reader provided in the vehicle 70. In a case of the user terminal 20, the immobilizer 60 receives the key information from the user terminal 20 by using a wireless communication apparatus (for example, Bluetooth (registered trademark) unit) provided in the communicator 50 or the vehicle 70.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic key management device comprising:
a generator configured to generate at least one of a first execution key and a second execution key for obtaining a permission for transiting to a registration mode for registering an electronic key of a vehicle in an in-vehicle authentication device or to an invalidation mode for invalidating the electronic key registered in the in-vehicle authentication device, in response to a predetermined request; and
a communication controller configured to transmit the first execution key generated by the generator to a first terminal device, and transmit the second execution key generated by the generator to a second terminal device that is a terminal device different from the first terminal device and is registered in advance as a terminal device of an authorized owner, wherein the first terminal device and the second terminal device are distinct from the vehicle and in-vehicle authentication device.

2. The electronic key management device of claim 1, wherein the generator generates an execution key related to the first execution key and the second execution key based on at least one of information on the vehicle or information on a registration date, and
the communication controller transmits the execution key to the in-vehicle authentication device.

3. The electronic key management device of claim 1, wherein the generator generates an execution key based on at least one of information on the vehicle or information on a registration date, and the execution key is a compilation of the first execution key and the second execution key.

4. The electronic key management device of claim 2, wherein the communication controller transmits the execution key generated by the generator to the in-vehicle authentication device that has transmitted the execution request of the registration mode or the invalidation mode.

5. The electronic key management device of claim 1, wherein the communication controller transmits information indicating a sequence when connecting the first execution key and the second execution key, to at least one of the first terminal device and the second terminal device.

6. An electronic key management system comprising:
the electronic key management device of claim 1; and
the in-vehicle authentication device configured to perform authentication based on the first execution key and the second execution key in a case where the first execution key and the second execution key are input, and executes the registration mode or the invalidation mode in a case where the authentication is successful.

7. An electronic key management system comprising:
the electronic key management device of claim 3; and
the in-vehicle authentication device configured to determine whether or not information based on the first execution key and the second execution key matches the execution key in a case where the execution key, the first execution key, and the second execution key are input, and determine that authentication is successful in a case where both of the information based on the first execution key and the second execution key matches the execution key.

8. An electronic key management method that causes a computer to:
generate at least one of a first execution key and a second execution key for obtaining a permission for transiting to a registration mode for registering an electronic key of a vehicle in an in-vehicle authentication device or to an invalidation mode for invalidating the electronic key registered in the in-vehicle authentication device, in response to a predetermined request;
transmit the generated first execution key to a first terminal device; and
transmit the generated second execution key to a second terminal device that is a terminal device different from the first terminal device and is registered in advance as a terminal device of an authorized owner, wherein the first terminal device and the second terminal device are distinct from the vehicle and in-vehicle authentication device.

9. A computer-readable non-transitory storage medium storing a program that causes a computer to:
generate at least one of a first execution key and a second execution key for obtaining a permission for transiting to a registration mode for registering an electronic key of a vehicle in an in-vehicle authentication device or to an invalidation mode for invalidating the electronic key registered in the in-vehicle authentication device, in response to a predetermined request;
transmit the generated first execution key to a first terminal device; and
transmit the generated second execution key to a second terminal device that is a terminal device different from the first terminal device and is registered in advance as a terminal device of an authorized owner, wherein the first terminal device and the second terminal device are distinct from the vehicle and in-vehicle authentication device.

* * * * *